(12) United States Patent
Liou et al.

(10) Patent No.: US 8,111,285 B2
(45) Date of Patent: Feb. 7, 2012

(54) STEREOSCOPIC DISPLAY APPARATUS AND DISPLAY METHOD

(75) Inventors: Jian-Chiun Liou, Kaohsiung County (TW); Kuen Lee, Hsinchu (TW); Jui-Feng Huang, Hsinchu (TW)

(73) Assignee: Industrial Technolgy Research Institute, Hsinchu (TW)

( * ) Notice: Subject to any disclaimer, the term of this patent is extended or adjusted under 35 U.S.C. 154(b) by 474 days.

(21) Appl. No.: 12/463,433

(22) Filed: May 11, 2009

(65) Prior Publication Data

US 2010/0165084 A1    Jul. 1, 2010

(30) Foreign Application Priority Data

Dec. 26, 2008   (TW) ................................ 97151118 A

(51) Int. Cl.
  *H04N 13/04* (2006.01)
(52) U.S. Cl. ................. 348/54; 348/58; 348/53; 348/51; 348/43; 348/56; 345/103; 345/419; 345/593; 345/158; 345/97; 359/466; 359/464; 359/221.2
(58) Field of Classification Search .................... 348/54, 348/58, 53, 51, 43, 47, 56
See application file for complete search history.

(56) References Cited

U.S. PATENT DOCUMENTS

| | | | |
|---|---|---|---|
| 6,448,952 B1 * | 9/2002 | Toyoda et al. | 345/97 |
| 7,576,805 B2 * | 8/2009 | Ito et al. | 349/15 |
| 2007/0188667 A1 | 8/2007 | Schwerdtner | |
| 2008/0158346 A1 * | 7/2008 | Okamoto et al. | 348/47 |

* cited by examiner

*Primary Examiner* — Jude Jean Gilles
(74) *Attorney, Agent, or Firm* — Jianq Chyun IP Office

(57) ABSTRACT

A stereoscopic display apparatus and a display method are provided. The stereoscopic display apparatus includes a display panel, a dynamic-backlight module, a tracking panel, an optical lens array. The display has an updated region and a non-updated region during a frame period the display panel displays according a first synchro-signal. The dynamic-backlight module has a plurality of light-emitting regions and the light-emitting regions are turned-on according to a second synchro-signal. The first synchro-signal and the second synchro-signal are synchronal. During the frame period, parts of the light-emitting regions corresponding to the updated region are synchronally turned-on and parts of the light-emitting regions corresponding to the non-updated region are synchronally turned-off. A light provided by at least the part of the light-emitting regions turned-on passes through one silt set and the display panel such that one of the single-eye images is only displayed by the non-updated region.

37 Claims, 8 Drawing Sheets

STEREOSCOPIC DISPLAY APPARATUS AND
DISPLAY METHOD

CROSS-REFERENCE TO RELATED
APPLICATION

This application claims the priority benefit of Taiwan application serial no. 97151118, filed on Dec. 26, 2008. The entirety of the above-mentioned patent application is hereby incorporated by reference herein and made a part of this specification.

BACKGROUND OF THE INVENTION

1. Field of the Invention

The present invention relates to a stereoscopic display apparatus and a display method.

2. Description of Related Art

As technology advances and develops, people's eagerness for better material life and spiritual life are increasing without a pause. When it comes to the spiritual life, in the world of technology, most people have the desire to realize their imagination and to experience it vividly with the help of various display devices. For this reason, how to develop display devices suitable for displaying three-dimensional images has become the goal to the manufacturers in the field.

In view of the appearance, the technology of three-dimensional display may be roughly categorized into two types. One is glasses-stereoscopic type which requires a viewer to wear specially designed glasses and the other is auto-stereoscopic type which allows the viewer to see directly with naked eyes. The glasses-stereoscopic type three-dimensional display technology has been developed to be mature and widely applied to some special fields such as military simulation or large-scale recreations, but the glasses-stereoscopic type three-dimensional display technology is difficult to be popularized due to its inconvenient and discomfort features. Therefore, the auto-stereoscopic type three-dimensional display technology has gradually developed and become a new trend.

FIG. 1 is a schematic view illustrating a prior art stereoscopic display apparatus. Referring to FIG. 1, the prior art stereoscopic display apparatus 100 includes a liquid crystal display panel 110 and a static micro-retarder 120. The liquid crystal display panel 110 is disposed in front of the static micro-retarder 120 such that light L irradiates on the liquid crystal display panel 110 after passing through the static micro-retarder 120. The liquid crystal display panel 110 includes a plurality of left-eye pixels $P_L$ and a plurality of right-eye pixels $P_R$. The left-eye pixels $P_L$ merely display a left-eye image and the right-eye pixels $P_R$ merely display a right-eye image.

After the light L passing through the static micro-retarder 120, the light L merely projects to left eye $O_L$ or right eye $O_R$ of viewer. In other words, the static micro-retarder 120 functions as a static parallax barrier. In this way, a left-eye image and a right-eye image of a display image can be seen by left eye $O_L$ and right eye $O_R$ of viewer, respectively. In brief, three-dimensional image is achieved by the static micro-retarder 120 in the stereoscopic display apparatus 100.

It is noted that, since pixels of the liquid crystal display panel 110 is spatially-divided into left-eye pixels $P_L$ and right-eye pixels $P_R$ to provide three-dimensional image, the left-eye pixels $P_L$ and right-eye pixels $P_R$ seen by left eye $O_L$ and right eye $O_R$ of viewer is half of all the pixels on the liquid crystal display panel 110. Accordingly, resolution of the three-dimensional image seen by viewer is reduced significantly.

Furthermore, since optical path of the light L are limited by the static micro-retarder 120, viewer can merely see the three-dimensional image at a predetermined view angle. When viewer watched the stereoscopic display apparatus 100 at another view angle which is different from the predetermined view angle, left eye $O_L$ and right eye $O_R$ of viewer may see incorrect three-dimension image and cross talk phenomenon of the stereoscopic display apparatus 100 may occur.

In order to enhance resolution of three-dimensional image, a dynamic micro-retarder has been proposed. FIG. 2 is a schematic view illustrating another prior art stereoscopic display apparatus. Referring to FIG. 2, the prior art stereoscopic display apparatus 200 includes a liquid crystal display panel 210, a dynamic micro-retarder 220, and an optical lens array 230. The optical lens array 230 is disposed between the liquid crystal display panel 210 and the dynamic micro-retarder 220. The liquid crystal display panel 210 is disposed in front of the dynamic micro-retarder 220 such that light L irradiates on the liquid crystal display panel 210 after passing through the dynamic micro-retarder 220. The dynamic micro-retarder 220 has a plurality of slits 222, wherein parts of the slits 222 are turned-on and the other parts of the slits 22 are turned-off according to the image displayed by the liquid crystal display panel 210 so as to provide proper three-dimension image.

Specifically, when the pixels 212 of the liquid crystal display 210 display right-eye image during a frame period, the slits 222R are transmissive and the slits 222L are opaque. During this frame period, the light L propagates along a right-eye optical path $L_R$ after passing through the dynamic micro-retarder 220, the optical lens array 230, and the pixels 212 such that a right-eye image can be seen by right eye $O_R$ of viewer. When the pixels 212 of the liquid crystal display 210 display left-eye image during next frame period, the slits 222R are opaque and the slits 222L are transmissive such that the light L propagates along a left-eye optical path $L_L$ and a left-eye image can be seen by left eye $O_L$ of viewer.

Since the state of the slits 222 in the dynamic micro-retarder 220 is controlled such that the image displayed by the same pixel 212 can be alternately projected onto right eye $O_R$ and left eye $O_L$ of viewer along the right-eye optical path $L_R$ and the left-eye optical path $L_L$, respectively. In other words, two eyes $O_R$ and $O_L$ of viewer can see the images displayed by all the pixels 212 of the liquid crystal display 210. Accordingly, the three-dimensional image displayed by the stereoscopic display apparatus 200 has full resolution.

In the stereoscopic display apparatus 200, images displayed by the pixels 212 are updated gradually and the slits 222 extend across multiple rows of pixels 212. When three-dimensional image is display by the stereoscopic display apparatus 200, parts of the slits 222 are simultaneously turned-on at the starting time point of each frame period. Accordingly, the image displayed by the non-updated pixels 212 passes through the slits 222 and projects onto one eye of viewer. The image displayed by the non-updated pixels 212 may result in incorrect three-dimension image and cross talk phenomenon of the stereoscopic display apparatus 200 may still occur.

SUMMARY OF THE INVENTION

The present disclosure provides a stereoscopic display apparatus having an input end for receiving position information of viewer. The stereoscopic display apparatus includes a display panel, a dynamic-backlight module having a plurality of light-emitting region, and a tracking panel disposed between the display panel and the dynamic-backlight module. The display has an updated region and a non-updated region during a frame period the display panel displays according a first synchro-signal, and two single-eye images are displayed by the updated region and the non-updated region respectively. The light-emitting regions are turned-on according to a second synchro-signal, the first synchro-signal and the second synchro-signal are synchronal, and during the frame period, parts of the light-emitting regions corresponding to the updated region are synchronally turned-on and parts of the light-emitting regions corresponding to the non-updated region are synchronally turned-off. The tracking panel has a plurality of silt sets. At least one of the slit sets of the tracking panel is turned-on according to position information of viewer and the second synchro-signal, and light provided by at least parts of the turned-on light-emitting regions passes through one of the silt sets and the display panel such that one of the single-eye images is only displayed by the non-updated region.

The present disclosure provides a display method for the above-mentioned stereoscopic display apparatuses. The display method includes establishing a plurality of slit data banks corresponding to a plurality of viewing angles of the stereoscopic display apparatus; selecting at least one of the slit data banks according to position information of viewer; activating the display panel and controlling at least one of the slit sets of the tracking panel according to the selected slit data bank; and changing on/off state of the transmissive areas corresponding to the updated region in the selected slit set during the frame period.

The present disclosure provides a stereoscopic display apparatus having an input end for receiving position information of viewer. The stereoscopic display apparatus includes a display panel, a backlight module for providing light, and a tracking panel disposed between the backlight module and the display panel. The display has an updated region and a non-updated region during a frame period the display panel displays according a first synchro-signal, and two single-eye images are displayed by the updated region and the non-updated region respectively. The tracking panel has a plurality of silt sets and each of the slit sets comprises a plurality of transmissive areas, and at least one of the slit sets of the tracking panel is selected according to position information of viewer and one of the single-eye images display by the updated region. During the frame period, on/off state of parts of the transmissive areas corresponding to the updated region is changed according to a second synchro-signal, on/off state of parts of the transmissive areas corresponding to the non-updated region is unchanged, and the first synchro-signal and the second synchro-signal are synchronal.

The present disclosure provides a display method for the above-mentioned stereoscopic display apparatuses. The display method includes establishing a plurality of slit data banks corresponding to a plurality of viewing angles of the stereoscopic display apparatus; selecting at least one of the slit data banks according to position information of viewer; activating the display panel and controlling at least one of the slit sets of the tracking panel according to the selected slit data bank; and changing on/off state of the transmissive areas corresponding to the updated region in the selected slit set during the frame period.

In the present disclosure, the light-emitting regions of the dynamic backlight module or the transmissive regions of the tracking panel are synchronally controlled according to image-updating condition of the display panel. Accordingly, cross talk phenomenon of the stereoscopic display apparatus can be improved significantly.

To make the above and other objectives, features, and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
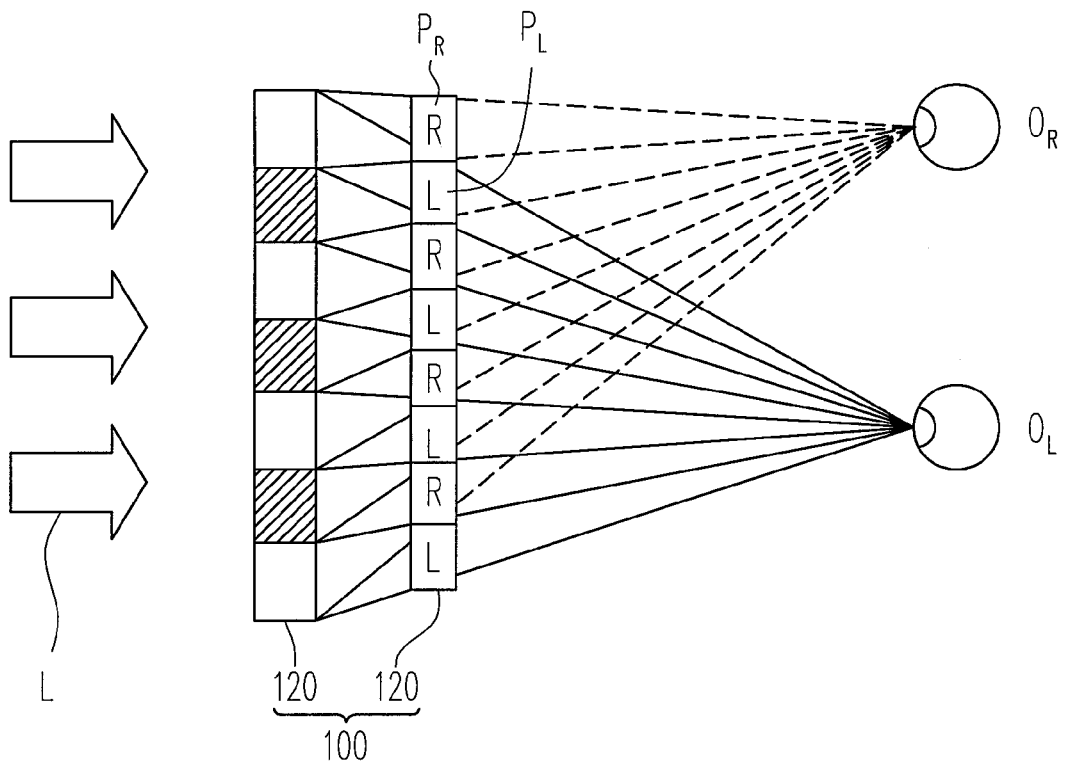
FIG. 1 is a schematic view illustrating a prior art stereoscopic display apparatus.
Figure 2:
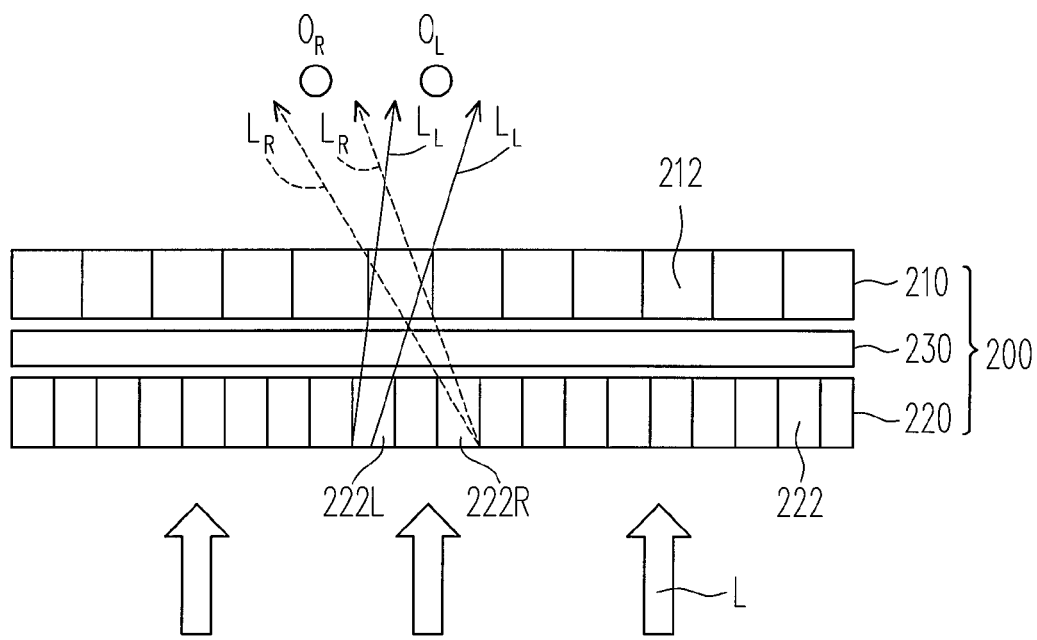
FIG. 2 is a schematic view illustrating another prior art stereoscopic display apparatus.
Figure 3A:
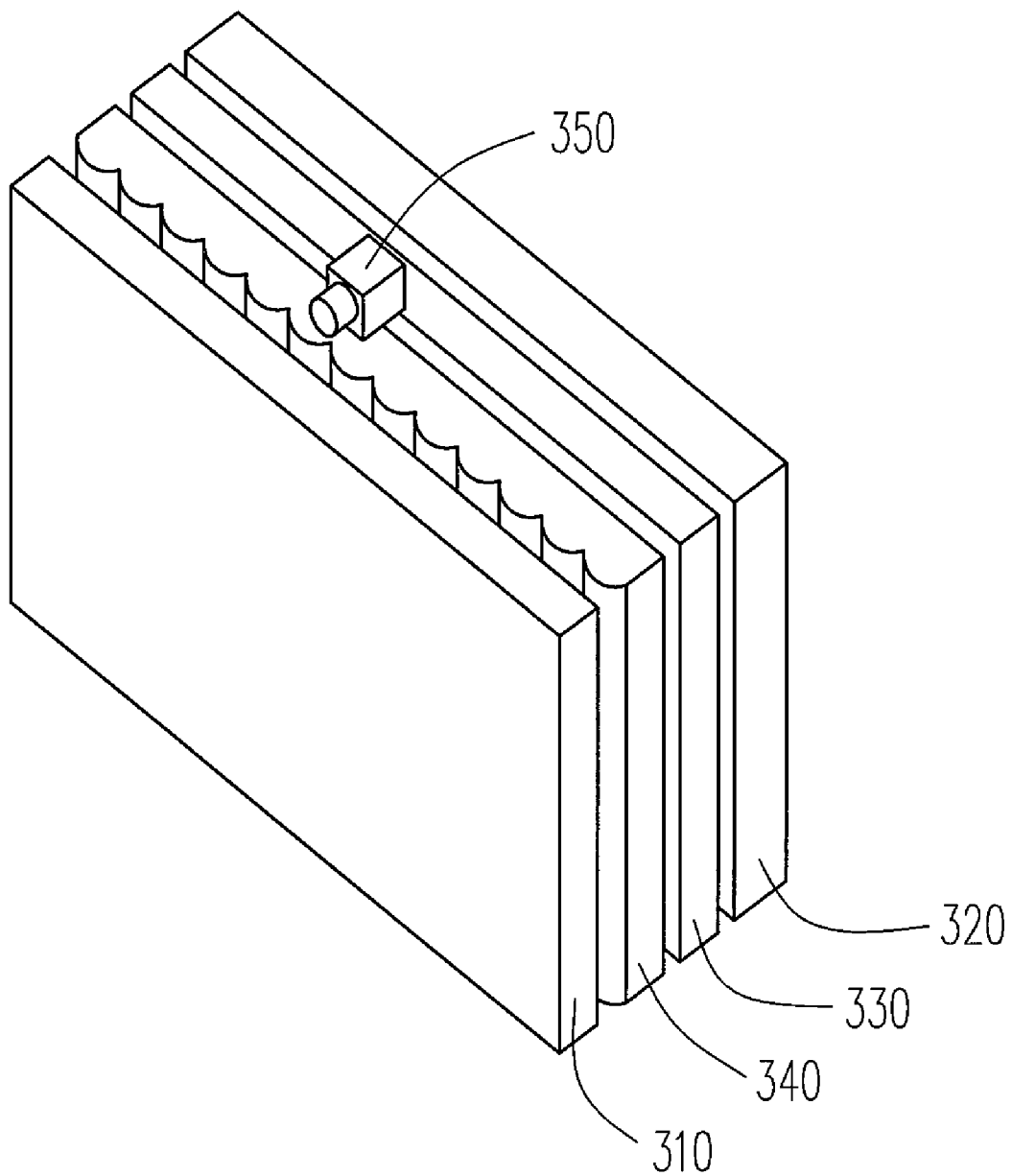
FIG. 3A is a schematic view illustrating a stereoscopic display apparatus according to an embodiment of the present disclosure.
Figure 3B:
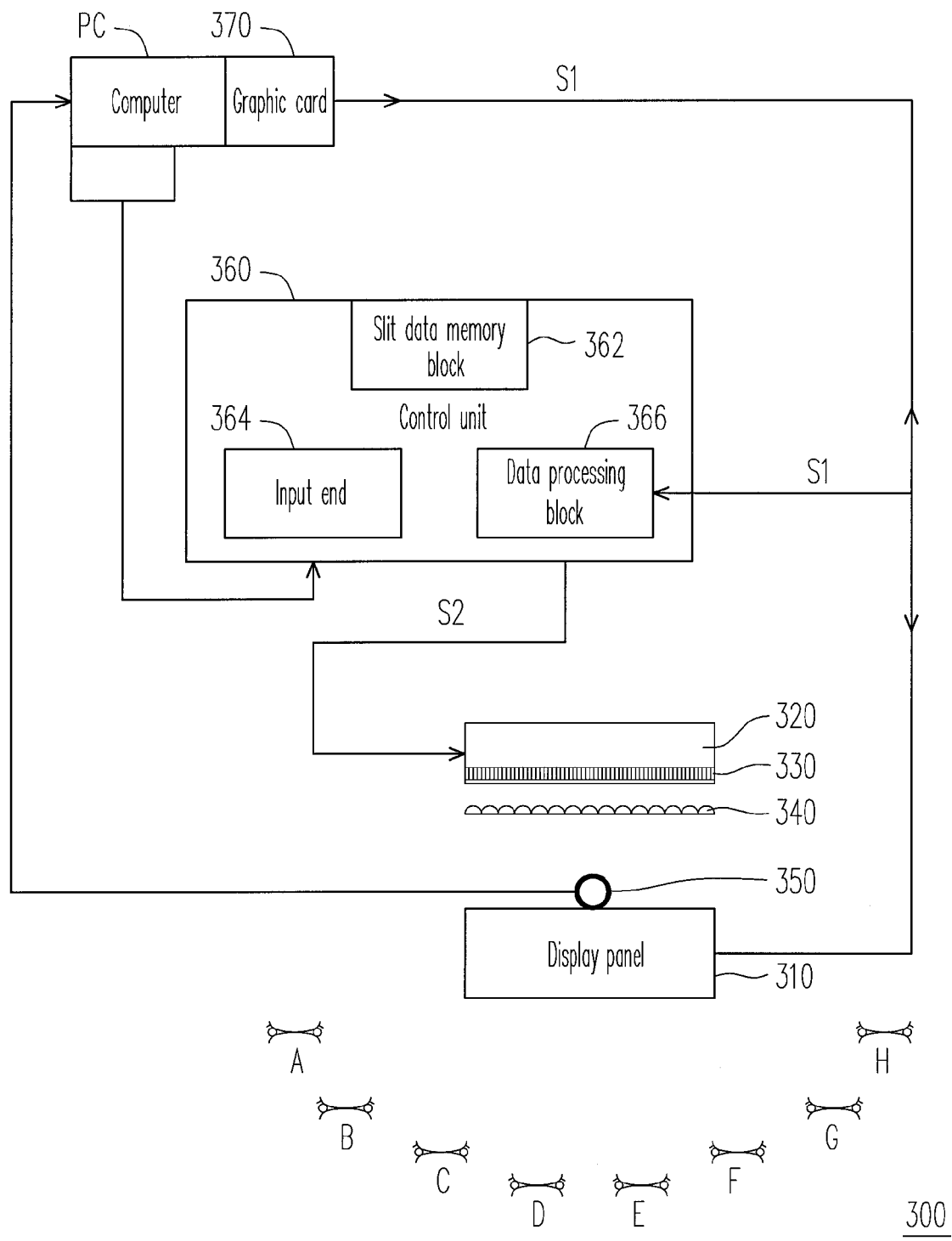
FIG. 3B is a block diagram illustrating the stereoscopic display apparatus of FIG. 3A.

FIG. 3A is a schematic view illustrating a stereoscopic display apparatus according to an embodiment of the present disclosure. FIG. 3B is a block diagram illustrating the stereoscopic display apparatus of FIG. 3A. Referring to FIG. 3A, the stereoscopic display apparatus 300 of the present embodiment includes a display panel 310, a backlight module 320, a tracking panel 330, and an optical lens array 340. The tracking panel 330 is disposed between the display panel 310 and the backlight module 320. The optical lens array 340 is disposed between the tracking panel 330 and the display panel 310.

In the stereoscopic display apparatus 300, different single-eye images (i.e. right-eye image and left-eye image) are alternately projected onto right eye and left eye of viewer O such that viewer O can see three-dimensional image. Since the tracking panel 330 functions as a dynamic micro-retarder, light emitted from the backlight module 320 can alternately project onto two eyes of viewer O after passing through the tracking panel 330, the optical lens array 340, and the display panel 310. The tracking panel 330 has a plurality of slit sets (not shown). Specifically, each slit set of the tracking panel 330 includes a plurality of single-eye slits and allows light emitted from the backlight module 320 merely projecting onto one eye of viewer O.

Referring to FIG. 3A and FIG. 3B, the stereoscopic display apparatus 300 further includes a control unit 360 and a computer PC equipped with a graphic card 370. The computer PC is electrically connected with the control unit 360 and the graphic card 370 is electrically connected with the display panel 310. Additionally, the control unit 360 is electrically connected with the backlight module 320 and the tracking panel 330.

The control unit 360 includes a slit data memory block 362 for storing a plurality of slit data banks, an input end 364, and a data processing block 366. The input end 364 receives position information of viewer. The data processing block 366 is electrically connected with a signal circuit board of the tracking panel 330. The electrical connections between the above-mentioned elements are not limited to be achieved by the computer PC.

A plurality of slit data banks are stored in the slit data memory block 362. After the input end 364 receiving the position information of viewer, the data processing block 366 compares the position information of viewer and the slit data banks stored in the slit data memory block 362 in advance and determines how to drive the tracking panel 330. In other words, after the position information of viewer and the slit data banks are compared by the data processing block 366, the control unit 360 can select one of the slit sets to be turned-on. In this way, three-dimensional image can be achieved by the selected slit set of the tracking panel 330. In the present embodiment, the stereoscopic display apparatus 300 may further includes an image capture device 350 for capturing and transmitting position information of viewer to the input end 364. In another embodiment, the position information of viewer can be input to the input end 364 through viewer's manual input.

Figure 3C:
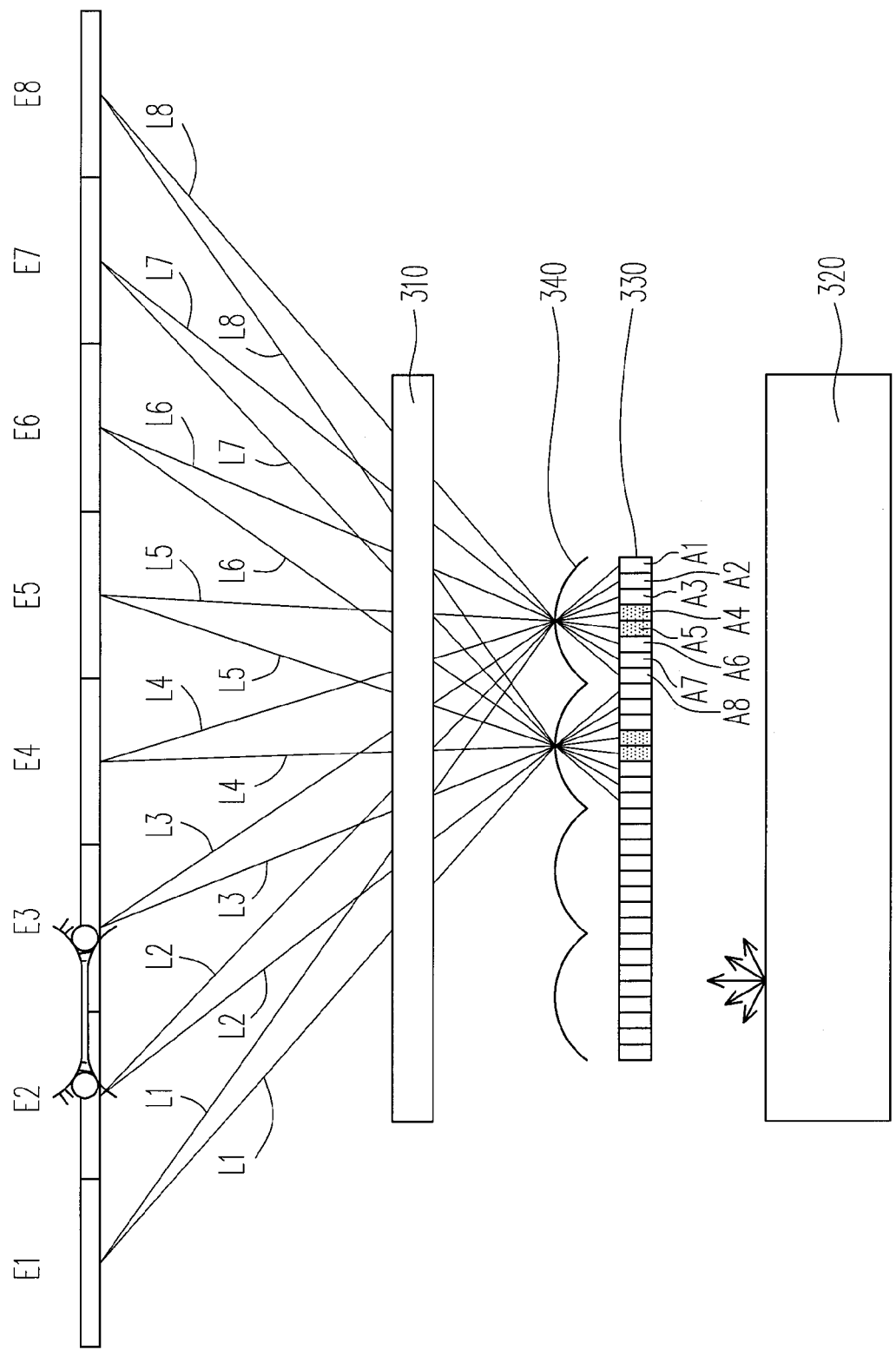
FIG. 3C is a schematic view illustrating relationship of optical paths and slit sets corresponding to different positions of viewers.

FIG. 3C is a schematic view illustrating relationship of optical paths and slit sets corresponding to different positions of viewers. Referring to FIG. 3C, one eye of viewer is assumed to be located at one of the positions E1~E8, the optical paths L1~L8 between the positions E1~E8 and the stereoscopic display apparatus 300 are different. Accordingly, slits A1~A8 corresponding to the optical paths L1~L8 are selected and turned-on according to position information of viewer. For example, when one eye of viewer is located at the position E1, the slits A1 of the tracking panel 330 should be turned-on such that image can be projected onto the position E1 along the optical path L1 correctly. Similarly, when one eye of viewer is located at the position E2, the slits A2 of the tracking panel 330 should be turned-on such that image can be projected onto the position E2 along the optical path L2 correctly. Slit data banks corresponding to different positions E1~E8 should be established in the stereoscopic display apparatus 300 such that the stereoscopic display apparatus 300 can determine which slits (A1, A2, A3, A4, A5, A6, A7 or A8) should be turned-on after receiving position information of viewer.

Referring to FIG. 3A and FIG. 3B, slit data banks corresponding to a plurality of viewing angles of the stereoscopic display apparatus 300 are established by inputting relationship of a right-eye optical path and a left-eye optical path corresponding to different viewing angles of the stereoscopic display apparatus 300 and estimating positions that the light passing through the tracking panel 330 along the right-eye optical path and the left-eye optical path. For example, the slit data banks may be information including five slit sets to be turned-on when viewer O is located at position A, position B, position C, position D, position E, position F, position G, or position H (shown in FIG. 3B). The above-mentioned five slit sets corresponding to position A, position B, position C, position D, position E, position F, position G, or position H are merely for illustration, the slit data banks may be information including more than or less than five slit sets and the present invention is not limited thereto.

In FIG. 3B, the control unit 360 compares the position information of viewer received by the input end 364 and the slit data banks and select one suitable slit set corresponding to the position of viewer O continuously. In this way, viewer O can see correct three-dimensional image at multiple positions.

Furthermore, if viewer O changes his position, the input end 364 can obtain position information of viewer immediately and the control unit 360 can select another slit set according to the new position of viewer O. Accordingly, viewer O can move freely when watching the stereoscopic display apparatus 300. The stereoscopic display apparatus 300 can track the position of viewer O, and viewer O is not necessarily requested to stay at a fix position.

The input end 364 can also obtain position information of multiple viewers when multiple viewers O want to watching the stereoscopic display apparatus 300 simultaneously. Under this condition, multiple slit sets in the tracing panel 330 are sequentially selected and turned-on through the control of the control unit 360. In other words, when multiple viewers O are watching the stereoscopic display apparatus 300, all the viewers can be see correct three-dimensional image simultaneously. The stereoscopic display apparatus 300 capable of being watched by multiple viewers is quite practical.

The graphic card 370 outputs a first synchro-signal S1 to the display panel 310 such that the display panel 310 is driven to display image. Additionally, the first synchro-signal S1 output from the graphic card 370 is also transmitted to the control unit 360.

The first synchro-signal S1 may be a signal corresponding to a single-eye image projected onto one eye of viewer during a frame period. The first synchro-signal S1 includes updating information (i.e. image data) of the pixels on the display panel 310. After receiving the first synchro-signal S1, the pixels on the display panel 310 are gradually updated such that the display panel 310 has an updated region and a non-updated region during the frame period. At this time, cross talk phenomenon of the stereoscopic display apparatus 300 may occur if no strategy is proposed.

In order to suppress cross talk phenomenon of the stereoscopic display apparatus 300, the control unit 360 outputs a second synchro-signal S2 in accordance with the first synchro-signal S1 to the backlight module 320 or the tracking panel 330. Here, the second synchro-signal S2 transmitted to the backlight module 320 or the tracking panel 330 is used to modulate the output mode of the backlight module 320 or on/off state of transmissive areas on tracking panel 330. Through the control of the control unit 360, light emitted from the backlight module 320 can project onto one eye of viewer O correctly after passing through the tracking panel 330, the optical lens array 340 and the display panel 310.

The present invention modulates the output mode of the backlight module 320 or on/off state of transmissive areas on tracking panel 330 to control the display mode of the stereoscopic display apparatus 300 such that viewer O can see correct three-dimensional image.

When the output mode of the backlight module 320 is modulated to control the display mode of the stereoscopic display apparatus 300, the backlight module 320 is, for example, a dynamic backlight module having a plurality of light-emitting regions (not shown). Through the control of second synchro-signal S2, the light-emitting regions are turned-on in sequence as the pixels of the display panel 310 are updated, wherein the updating speed of the light-emitting regions and the updating speed of pixels are substantially synchronal. In other words, in the backlight module 320, parts of the light-emitting regions corresponding to the updated region of the display panel 310 are turned-on. Additionally, design and operation mode of the tracking panel 330 in the present embodiment can be the same with those of prior art dynamic micro-retarder.

When on/off state of transmissive areas on tracking panel 330 is modulated to control the display mode of the stereoscopic display apparatus 300, the tracking panel 330 is design to have a plurality of silt sets and each of the slit sets includes a plurality of transmissive areas (not shown). Through the control of second synchro-signal S2, the transmissive areas are turned-on or turned-off (i.e. on/off state of the transmissive areas are switched) as the pixels of the display panel 310 is updated, wherein the switching speed of the transmissive areas and the updating speed of pixels are substantially synchronal.

The display panel 310 alternately displays right-eye images and left-eye images. When a left-eye image displayed by the display panel 310 is updated by a right-eye image during a frame period, the updated right-eye image is displayed by parts of the pixels in the updated region and the previous left-eye image is displayed by other parts of the pixels in the non-updated region. Specifically, on/off state of the transmissive areas in the tracking panel 330 is properly modulated such that parts of the transmissive areas, which merely allow the right-eye image displayed by the updated region of the display panel 310 projecting onto right eye of viewer O, are turned-on. Additionally, other parts of the transmissive areas, which merely allow the left-eye image displayed by the non-updated region of the display panel 310 projecting onto left eye of viewer O, are turned-on.

Under the above-mentioned display modes, two eyes of viewer O can see three-dimensional image output from the graphic card 370 correctly and cross talk phenomenon of the stereoscopic display apparatus 300 is improved significantly. In other words, quality of the three-dimensional image displayed by the stereoscopic display apparatus 300 is good. Details of the above-mentioned display modes are described as following.

Figure 4A:
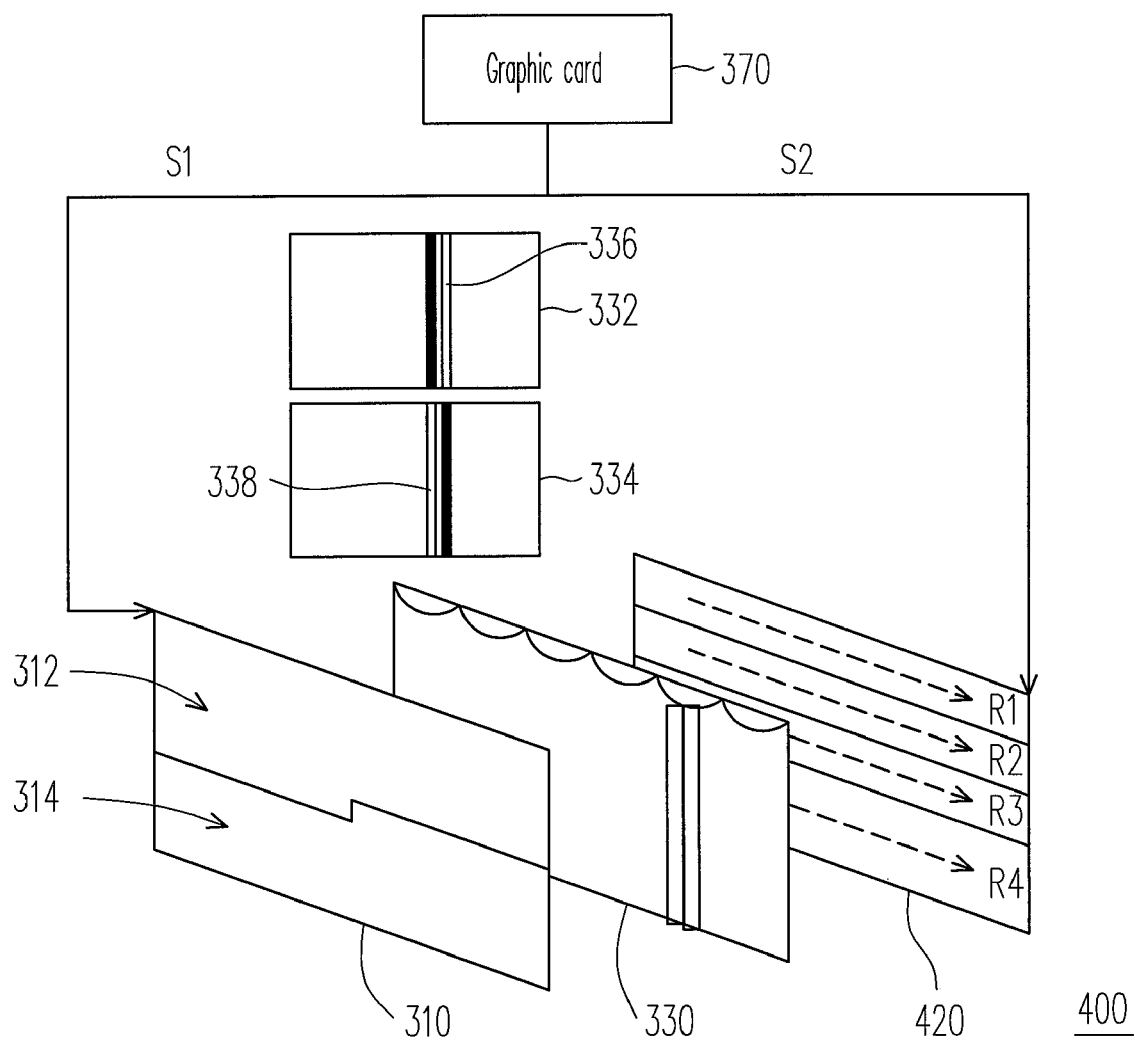
FIG. 4A is a schematic view illustrating a stereoscopic display apparatus according to the first embodiment of the present disclosure.
Figure 4B:
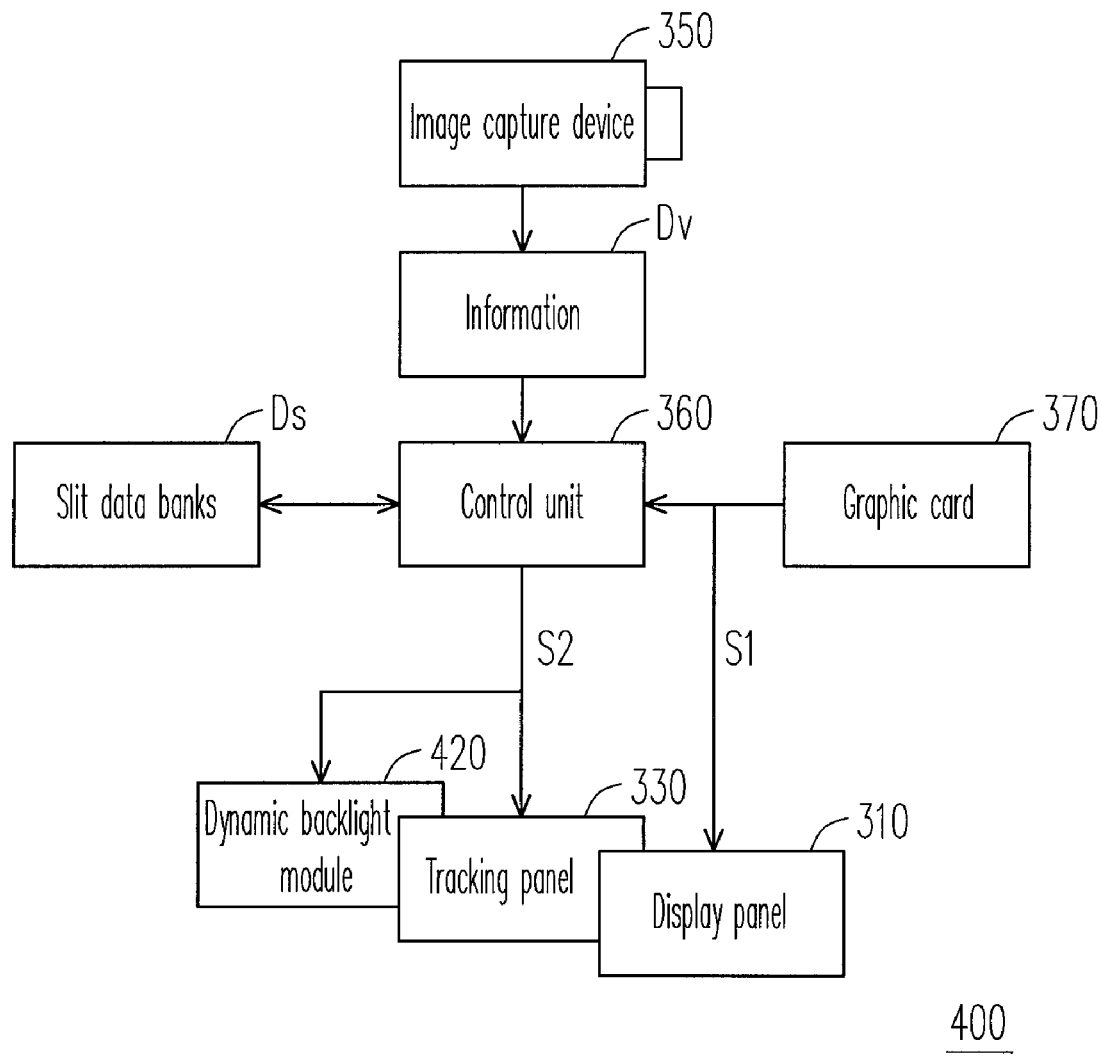
FIG. 4B is a block diagram illustrating the stereoscopic display apparatus of FIG. 4A.

FIG. 4A is a schematic view illustrating a stereoscopic display apparatus according to the first embodiment of the present invention. FIG. 4B is a block diagram illustrating the stereoscopic display apparatus of FIG. 4A. Referring to FIG. 4A and FIG. 4B, the stereoscopic display apparatus 400 is similar with the stereoscopic display apparatus 300 shown in FIG. 3A, wherein the same or similar numerals represent the same or similar elements, respectively. Additionally, function of the stereoscopic display apparatus 400 is also similar with that of the stereoscopic display apparatus 300. In other words, the stereoscopic display apparatus 400 can track viewer's position or can be watched by multiple viewers.

The backlight module of stereoscopic display apparatus 400 is a dynamic backlight module 420 having a plurality of light-emitting regions R1~R4. It is noted that control unit and optical lens array are omitted in FIG. 4A. In the stereoscopic display apparatus 400, the graphic card 370 outputs and transmits the first synchro-signal S1 to the control unit. After receiving the first synchro-signal S1, the control unit outputs a second synchro-signal S2 according to the first synchro-signal S1 to control (turn-on or turn-off) the light-emitting regions R1~R4.

During a frame period, the display panel 310 displays according to the first synchro-signal S1 and the display panel 310 has an updated region 312 and a non-updated region 314. Different single-eye images (i.e. right-eye image and left-eye image) are displayed by the updated region 312 and the non-updated region 314, respectively. In other words, each pixel of the display panel 310 is updated gradually during the frame period, wherein the updated region 312 is defined by the updated pixels and the non-updated region 314 is defined by the non-updated pixels. The frame rate (updating speed) of the display panel 310 is about 120 Hz or more than 120 Hz. In this way, the display panel 310 can display three-dimensional image smoothly and the frame rate of the three-dimensional image (including right-eye image and left-eye image) is about 60 Hz or more than 60 Hz.

The tracking panel 330 has a plurality of slit sets 332 and 334. One of the slit sets 332 and 334 of the tracking panels 330 is selected and turned-on according to position information of viewer O and the second synchro-signal S2. Specifically, each of the slit sets 332 and 334 includes a plurality of single-eye slits 336 and 338. Light emitted from the dynamic backlight module 420 passes through the single-eye slit 336 and the display panel 310 and projects onto one eye of viewer O. Similarly, light emitted from the dynamic backlight module 420 passes through the single-eye slit 338 and the display panel 310 and projects onto another eye of viewer O. Accordingly, two single-eye images are projected onto two eyes of viewer O and viewer O can see correct three-dimensional image.

For example, light emitted from the dynamic backlight module 420 passes through the single-eye slit 336 of the slit set 332 and the display panel 310 and projects onto left eye $O_L$ of viewer O. Similarly, light emitted from the dynamic backlight module 420 passes through the single-eye slit 338 of the slit set 334 and the display panel 310 and projects onto right eye $O_R$ of viewer O. Additionally, the single-eye slits 336 and 338 are of striped shape and length of the single-eye slits 336 and 338 are substantially equal to longitudinal length of the display panel 310.

In the present embodiment, when the display panel 310 displays image according to the first synchro-signal S1, the slit set 332 of the tracking panel 330 is turned-on. Meanwhile, pixels in the updated region 312 of the display panel 310 displays left-eye image, but pixels in the non-updated region 314 of the display panel 310 still displays previous right-eye image. Light passing through the slit set 332 of the tracking panel 330 and the non-updated region 314 of the display panel 310 may be projected onto left eye $O_L$ of viewer O (i.e. cross talk phenomenon) if no strategy is proposed. The present embodiment proposes the dynamic backlight module 420 to suppress the cross talk phenomenon. The light-emitting regions R1~R4 of the dynamic backlight module 420 are respectively controlled according to the second synchro-signal S2, wherein the first synchro-signal S1 and the second synchro-signal S2 are synchronal.

During a frame period, the light-emitting regions R1 and R2 corresponding to the updated region 312 are turned-on and the light-emitting regions R3 and 34 corresponding to the non-updated region 314 are turned-off. In this way, only the light-emitting regions R1 and R2 can provide light such that no light passes through the slit set 332 of the tracking panel 330 and the non-updated region 314 of the display panel 310 and cross talk phenomenon of the stereoscopic display apparatus 400 is improved.

Referring to FIG. 4B, a display method of the stereoscopic display apparatus 400 includes the following steps. First, slit data banks Ds corresponding to a plurality of viewing angles of the stereoscopic display apparatus 500 are established. Then, the control unit 360 receives position information Dv of viewer. Next, the control unit 360 compares the position information Dv and the slit data banks Ds stored in advance. Meanwhile, the control unit 360 outputs the second synchro-signal S2 in accordance with the first synchro-signal S1 output from the graphic card 370 to control the output mode of the dynamic backlight module 420 and operation mode of the tracking panel 330. Additionally, the display panel 310 is driven to display image (i.e. image updating) according to the first synchro-signal S1 output from the graphic card 370.

As shown in FIG. 4A and FIG. 4B, the plurality of light-emitting regions R1~R4 of the dynamic backlight module 420 are of striped shape and the light-emitting regions R1~R4 extend across the slits of the tracking panel 330. In a preferred embodiment, the extending direction of the light-emitting regions R1~R4 is perpendicular to the extending direction of the slits of the tracking panel 330. In another embodiment, the plurality of light-emitting regions R1~R4 of the dynamic backlight module 420 are arranged in array. Specifically, light-emitting diodes can be used as dot light source of the dynamic backlight module 420, lamp tubes or light bar or other suitable linear light source can also be used in the dynamic backlight module 420. The type of light source used in the dynamic backlight module 420 is not limited in the present invention.

When the dynamic backlight module 420 is modulated to control the display mode of the stereoscopic display apparatus 300, the updating speed of the light-emitting regions R1~R4 and the updating speed of pixels are synchronal. During each and every frame period, three-dimensional image seen by viewer O is correct. Accordingly, the three-dimensional image displayed by the stereoscopic display apparatus 400 has full resolution. The stereoscopic display apparatus 400 can track viewer's position or can be watched by multiple viewers. In other words, quality of the three-dimensional image displayed by the stereoscopic display apparatus 400 is good.

Figure 5A:
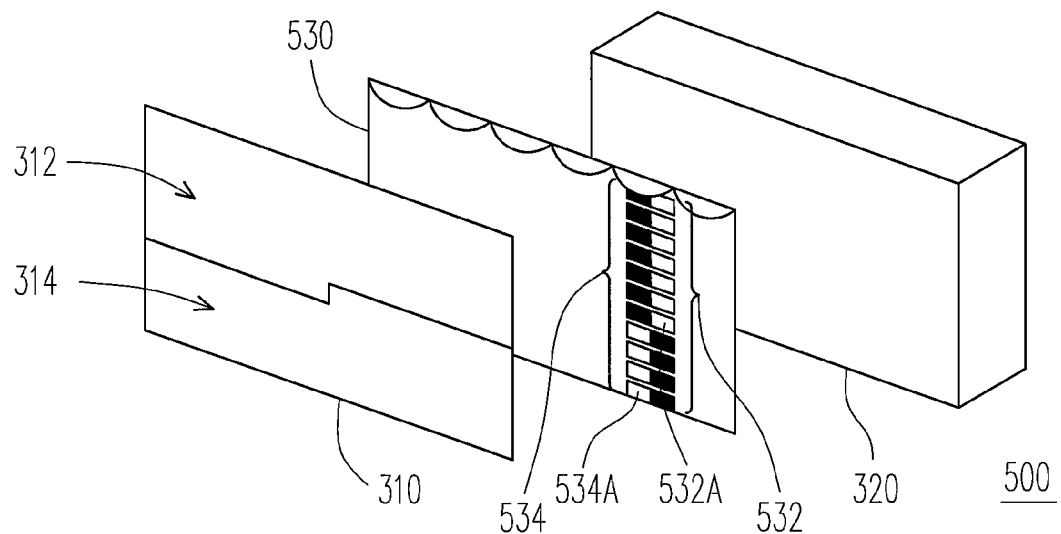
FIG. 5A is a schematic view illustrating a stereoscopic display apparatus according to the second embodiment of the present disclosure.
Figure 5A:
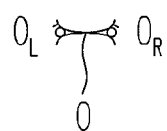
Figure 5B:
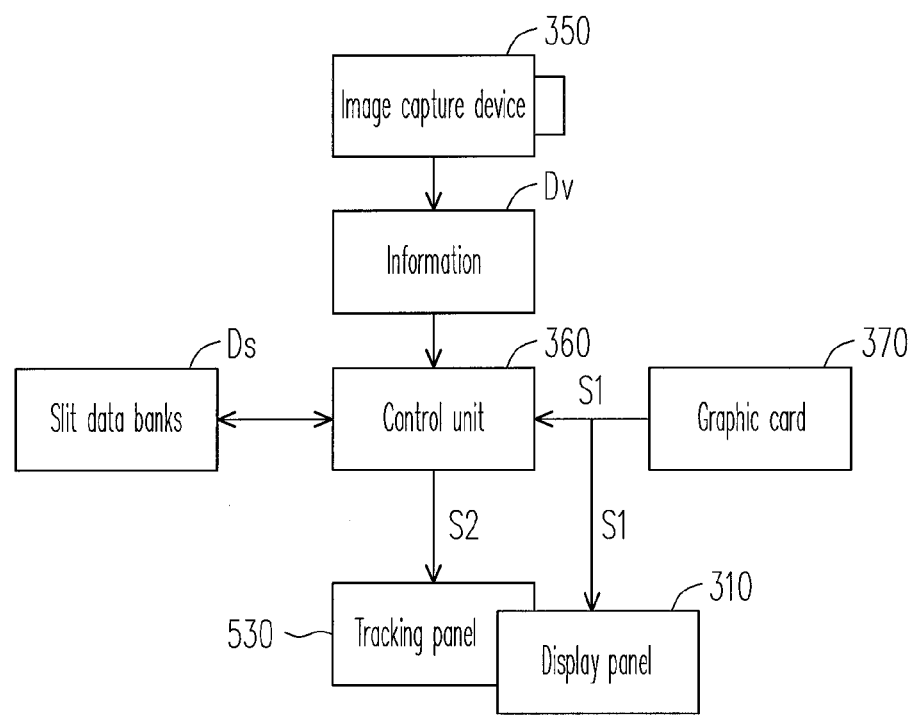
FIG. 5B is a block diagram illustrating the stereoscopic display apparatus of FIG. 5A.

FIG. 5A is a schematic view illustrating a stereoscopic display apparatus according to the second embodiment of the present invention. FIG. 5B is a block diagram illustrating the stereoscopic display apparatus of FIG. 5A. Referring to FIG. 5A, the stereoscopic display apparatus 500 is modified from the stereoscopic display apparatus 300, wherein the same or similar numerals represent the same or similar elements, respectively. It is noted that control unit and optical lens array are omitted in FIG. 5A. The tracking panel 530 of the stereoscopic display apparatus 500 is different from the above-mentioned tracking panel 330. In addition to the plurality of slit sets 532 and 534, the slit set 532 includes a plurality of transmissive areas 532A arranged in array and the slit set 534 includes a plurality of transmissive areas 534A arranged in array. In the present embodiment, only two slit sets 532 and 534 are described for illustration, the tracking panel 530 may have more than two slit sets.

Referring to FIG. 5A and FIG. 5B, each pixel of the display panel 310 is updated gradually during the frame period, wherein the updated region 312 is defined by the updated pixels and the non-updated region 314 is defined by the non-updated pixels. When the display panel 310 displays image according to the first synchro-signal S1 during a frame period, on/off state of parts of the transmissive areas 532A and 534A corresponding to the updated region 312 is changed and on/off state of parts of the transmissive areas 532A and 534A corresponding to the non-updated region 314 is unchanged.

The light-emitting regions R1 and R2 corresponding to the updated region 312 are turned-on and the light-emitting regions R3 and 34 corresponding to the non-updated region 314 are turned-off.

In the present embodiment, when the display panel 310 displays image according to the first synchro-signal S1, the images displayed by the updated region 312 and the non-updated region 314 are both projected onto one eye of viewer O (i.e. cross talk phenomenon) if no strategy is proposed. The present embodiment proposes the tracking panels 530 having novel transmissive area design to suppress the cross talk phenomenon. In the present embodiment, the control unit 360 receives the first synchro-signal S1 and outputs a second synchro-signal S2 in accordance with the first synchro-signal S1 to control the tracking panels 530. The second synchro-signal S2 is used to control on/off state of each of the transmissive areas 532A and 534A.

In the present embodiment, light passing through the slit sets 532 and 534 are projected onto two eyes of viewer O, respectively. Light passing through the slit set 532 is projected onto left eye $O_L$ of viewer O and light passing through the slit set 534 is projected onto right eye $O_R$ of viewer O. When the display panel 310 is driven to display left-eye image according to the first synchro-signal S1, on/off state of the transmissive areas 532A and the transmissive areas 534A are well controlled in the present embodiment. Specifically, parts of the transmissive areas 532A of the slit set 532 corresponding to the updated region 312 are turned-on and other parts of the transmissive areas 532A of the slit set 532 corresponding to the non-updated region 314 are turned-off. Parts of the transmissive areas 534A of the slit set 534 corresponding to the updated region 312 are turned-off and other parts of the transmissive areas 534A of the slit set 534 corresponding to the non-updated region 314 are turned-on. In other words, during this frame period, on/off state of the transmissive areas 532A and the transmissive areas 534A corresponding to the non-updated region 314 is unchanged. Additionally, when the display panel 310 is driven to display left-eye image, the transmissive areas 532A of the slit set 532 are turned-on gradually and the transmissive areas 534A of the slit set 534 are turned-off gradually.

The single-eye image displayed by the updated region 312 can pass through parts of the transmissive areas 532A and can be seen by left eye $O_L$ of viewer O, while the single-eye image displayed by the non-updated region 314 can pass through parts of the transmissive areas 534A and can be seen by right eye $O_R$ of viewer O. Accordingly, cross talk phenomenon of the stereoscopic display apparatus 500 is effectively suppressed. It is noted that since the first synchro-signal S1 and the second synchro-signal S2 are synchronal, the updating speed of the transmissive areas 532A and 534A and the updating speed of pixels are substantially synchronal, and the cross talk phenomenon can be prevented.

In the present embodiment, a plurality of slit data banks Ds corresponding to a plurality of viewing angles of the stereoscopic display apparatus 500 are stored in the control unit 360. That is, viewer O can move freely when watching the stereoscopic display apparatus 500. The stereoscopic display apparatus 500 can track the position of viewer O, and viewer O is not necessarily requested to stay at a fix position.

Referring to FIG. 5B, a display method of the stereoscopic display apparatus 500 includes the following steps. First, slit data banks Ds corresponding to a plurality of viewing angles of the stereoscopic display apparatus 500 are established. Then, the control unit 360 receives position information Dv of viewer and selects at least one slit data bank Ds. Next, the display panel is activated and at least one slit set 532 or 534 of the tracking panel 530 is turned-on according to the selected slit data bank Ds. Thereafter, on/off state of the transmissive areas 532A or 534A corresponding to the updated region 312 in the selected slit set 532 or 534 is changed during the frame period.

The frame rate (updating speed) of the display panel 310 is about 120 Hz or more than 120 Hz. In this way, the display panel 310 can display three-dimensional image smoothly. Additionally, the backlight module of the present embodiment is a static backlight module which provides the light continuously and stably. To achieve better display quality, the updating speed of the transmissive areas 532A and 534A on the tracking panel 530 and the updating speed of the pixels on the display panel 310 are synchronal preferably. Accordingly, the first synchro-signal S1 and the second synchro-signal S2 are synchronal preferably. In a preferred embodiment, the time point the first synchro-signal S1 transmitting to the display panel 310 and the time point the second synchro-signal S2 transmitting to the tracking panel 530 are synchronal. Since the first synchro-signal S1 is transmitted to the tracking panel 530 through the control unit 360 and the second synchro-signal S2 is transmitted from the graphic card 370 to the display panel 310 directly, a delayer (not shown) may be disposed between the display panel 310 and the graphic card 370 to delay the time point the first synchro-signal S1 transmitting to the display panel 310.

Figure 5C:
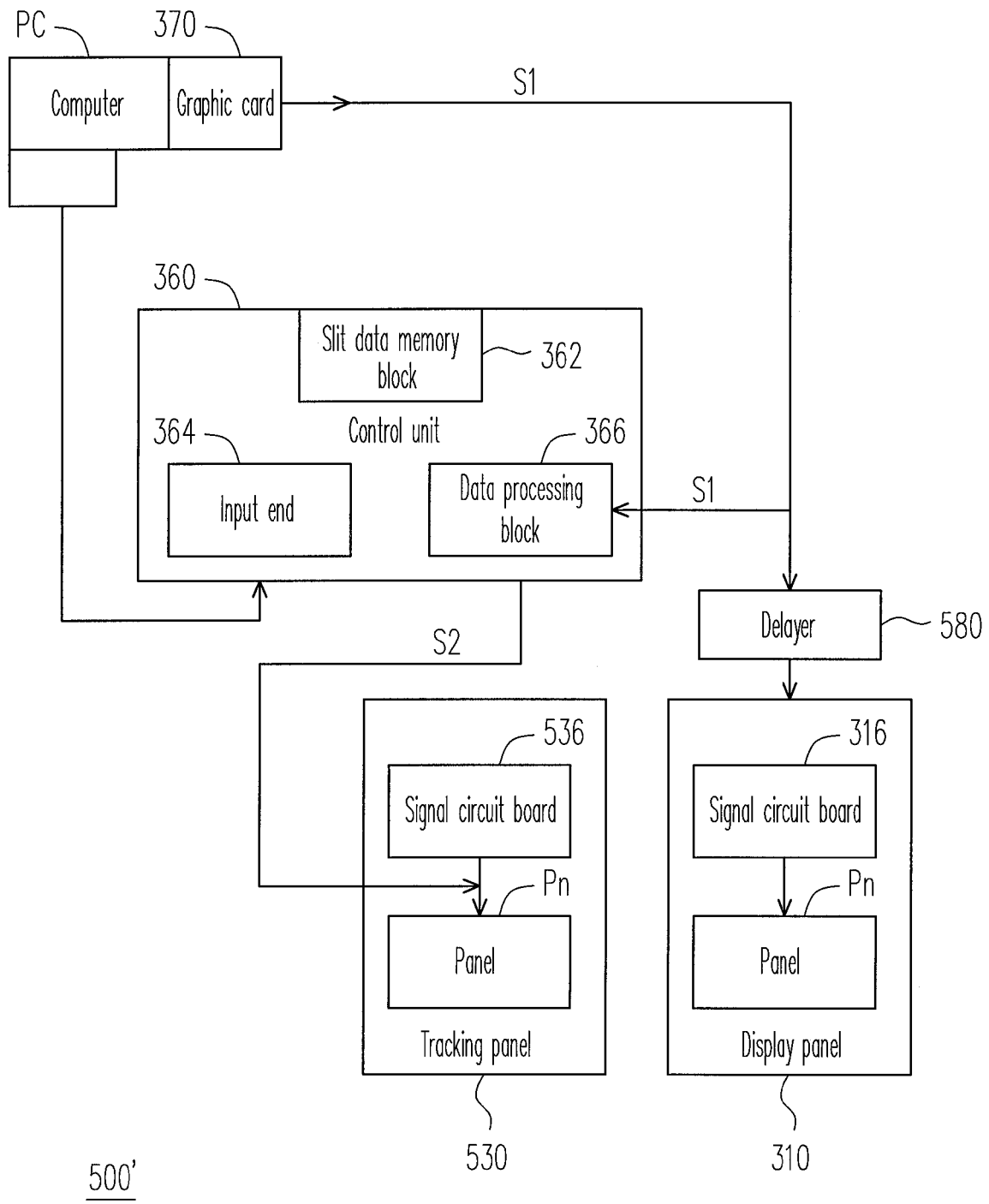
FIG. 5C is another block diagram illustrating the stereoscopic display apparatus of FIG. 5A.

FIG. 5C is another block diagram illustrating the stereoscopic display apparatus of FIG. 5A. Referring to FIG. 5C, the stereoscopic display apparatus 500' is similar with the stereoscopic display apparatus 500. In order to synchronize the time point the first synchro-signal S1 transmitting to the display panel 310 and the time point the second synchro-signal S2 transmitting to the tracking panel 530, the stereoscopic display apparatus 500' further includes a delayer 580. Furthermore, the display panel 310 includes a panel Pn and a signal circuit board 316, and the tracking panel 530 includes a panel Pn and a signal circuit board 536. After receiving the first synchro-signal S1, the signal circuit board 316 controls the updating of pixels on the display panel 310. After receiving the second synchro-signal S2, the signal circuit board 536 controls the updating of slit set 532 and 534 on the tracking panel 530. The delayer 580 is used to delay the time point the first synchro-signal S1 transmitting to the display panel 310 such that the display panel 310 and the slit set 532 and 534 on the tracking panel 530 can be updated synchronally.

The delayer 580 may also be used in the stereoscopic display apparatus 400 as shown in FIG. 4A and FIG. 4B such that the updating speed of the display panel 310 and the updating speed of the dynamic backlight module 420 are synchronal. Moreover, each of the display panel 310 and the tracking panel 330 in the stereoscopic display apparatus 400 may includes a panel and a signal circuit board electrically connected to the panel.

In an alternative embodiment, the computer and the graphic card mentioned above may be integrated into the control unit. In other words, the computer, the graphic card, and the control unit are integrated into a control module. The control module is capable of executing each and every operation executed by the computer to control the display mode of the stereoscopic display apparatus and outputting synchrosignals to the display panel and the tracking panel directly.

The invention modulates the output mode of the backlight module or on/off state of transmissive areas on tracking panel to control the display mode of the stereoscopic display apparatus and improve the cross talk phenomenon. Furthermore, through the control of the output mode of the backlight module or on/off state of transmissive areas on tracking panel, the stereoscopic display apparatus of the present invention can track the position of viewer and viewer is not necessarily requested to stay at a fix position when watching three-dimensional image. The stereoscopic display apparatus of the present invention can be watched by multiple viewers simultaneously. The stereoscopic display apparatus and the display method of the present invention can provide good display quality and is practical.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A stereoscopic display apparatus having an input end for receiving position information of viewer, comprising:
   a display panel, wherein the display has an updated region and a non-updated region during a frame period the display panel displays according a first synchro-signal, and two single-eye images are displayed by the updated region and the non-updated region respectively;
   a dynamic-backlight module having a plurality of light-emitting regions, wherein the light-emitting regions are turned-on according to a second synchro-signal, the first synchro-signal and the second synchro-signal are synchronal, and during the frame period, parts of the light-emitting regions corresponding to the updated region are synchronally turned-on and parts of the light-emitting regions corresponding to the non-updated region are synchronally turned-off;
   a tracking panel disposed between the display panel and the dynamic-backlight module, wherein the tracking panel has a plurality of silt sets; and
   wherein at least one of the slit sets of the tracking panel is turned-on according to position information of viewer and the second synchro-signal, and light provided by at least parts of the turned-on light-emitting regions passes through one of the silt sets and the display panel such that one of the single-eye images is only displayed by the non-updated region.

2. The stereoscopic display apparatus of claim 1, wherein each of the slit sets comprises a plurality of single-eye slits, the light passes through the single-eye slits and the display panel to provide the single-eye image seen by one eye of viewer.

3. The stereoscopic display apparatus of claim 2, wherein the single-eye slits extend across the light-emitting regions, and the single-eye slits extend across the updated region and the non-updated region.

4. The stereoscopic display apparatus of claim 1, wherein the light-emitting regions are of striped shape.

5. The stereoscopic display apparatus of claim 1, wherein the light-emitting regions are arranged in an array.

6. The stereoscopic display apparatus of claim 1, further comprising a control unit, wherein the input end is disposed in the control unit and the control unit is electrically connected with a signal circuit board of the tracking panel.

7. The stereoscopic display apparatus of claim 6, further comprising a graphic card electrically connected with a signal circuit board of the display panel and the control unit, wherein the graphic card outputs the first synchro-signal to the display panel so as to update the single-eye images.

8. The stereoscopic display apparatus of claim 7, wherein the control unit comprises a slit data memory block with a plurality of slit data banks therein and a data processing block electrically connected with the graphic card, the data processing block is electrically connected with the signal circuit board of the tracking panel, and after the input end receiving the position information of viewer, the data processing block compares the position information of viewer and the slit data banks.

9. The stereoscopic display apparatus of claim 7, further comprising a delayer electrically connected between the signal circuit board of the display panel and the graphic card.

10. The stereoscopic display apparatus of claim 7, wherein the control unit is electrically connected with the dynamic-backlight module, the control unit outputs the second synchro-signal according to a refreshing rate of the first synchro-signal, the control unit turns on the light-emitting regions of the dynamic-backlight module and turns on at least one of the slit sets of the tracking panel according to a second synchro-signal.

11. The stereoscopic display apparatus of claim 1, wherein one of the slit sets of the tracking panel is turned-on according to the position information of viewer and the second synchro-signal.

12. The stereoscopic display apparatus of claim 1, wherein more than one of the slit sets of the tracking panel is turned-on according to the position information of viewer and the second synchro-signal when the position information of viewer comprises more than one position information.

13. The stereoscopic display apparatus of claim 1, further comprising an optical lens array disposed between the display panel and the tracking panel.

14. A stereoscopic display apparatus having an input end for receiving position information of viewer, comprising:
    a display panel, wherein the display has an updated region and a non-updated region during a frame period the display panel displays according a first synchro-signal, and two single-eye images are displayed by the updated region and the non-updated region respectively;
    a backlight module for providing light;
    a tracking panel disposed between the backlight module and the display panel, wherein the tracking panel has a plurality of silt sets and each of the slit sets comprises a plurality of transmissive areas, and at least one of the slit sets of the tracking panel is selected according to position information of viewer and one of the single-eye images display by the updated region; and
    during the frame period, on/off state of parts of the transmissive areas corresponding to the updated region is changed according to a second synchro-signal, on/off state of parts of the transmissive areas corresponding to the non-updated region is unchanged, and the first synchro-signal and the second synchro-signal are synchronal.

15. The stereoscopic display apparatus of claim 14, wherein parts of the transmissive areas corresponding to the updated region in one selected slit set are turned-on during the frame period and parts of the transmissive areas corresponding to the non-updated region in one selected slit set are turned-off during the frame period.

16. The stereoscopic display apparatus of claim 15, wherein parts of the transmissive areas corresponding to the non-updated region in another selected slit set are turned-on during a previous frame period and parts of the transmissive areas corresponding to the updated region in another selected slit set are turned-off during the previous frame period.

17. The stereoscopic display apparatus of claim 14, wherein the light passes through the transmissive areas of each slit set and the display panel to provide one of the single-eye images seen by one eye of viewer.

18. The stereoscopic display apparatus of claim 14, further comprising a control unit electrically connected with a signal circuit board of the tracking panel.

19. The stereoscopic display apparatus of claim 18, further comprising a graphic card electrically connected with a signal circuit board of the display panel and the control unit, wherein the graphic card outputs the first synchro-signal to the display panel and the control unit so as to update the single-eye images.

20. The stereoscopic display apparatus of claim 19, wherein the control unit comprises a slit data memory block with a plurality of slit data banks therein, the input end, and a data processing block electrically connected with the graphic card, the data processing block is electrically connected with the signal circuit board of the tracking panel, and after the input end receiving the position information of viewer, the data processing block compares the position information of viewer and the slit data banks to select at least one of the slit sets of the tracking panel and outputs the second synchro-signal according to the first synchro-signal transmitted by the graphic card so as to change on/off state of parts of the transmissive areas in the selected slit set.

21. The stereoscopic display apparatus of claim 19, further comprising a delayer electrically connected between the signal circuit board of the display panel and the graphic card.

22. The stereoscopic display apparatus of claim 14, wherein one of the slit sets of the tracking panel is selected according to the position information of viewer when the position information of viewer comprises one position information.

23. The stereoscopic display apparatus of claim 14, wherein more than one of the slit sets of the tracking panel is selected according to the position information of viewer when the position information of viewer comprises more than one position information.

24. The stereoscopic display apparatus of claim 14, wherein the backlight module provides the light continuously and stably.

25. The stereoscopic display apparatus of claim 14, further comprising an optical lens array disposed between the display panel and the tracking panel.

26. A display method for the stereoscopic display apparatus of claim 1, the display method comprising:
    establishing a plurality of slit data banks corresponding to a plurality of viewing angles of the stereoscopic display apparatus;
    selecting at least one of the slit data banks according to position information of viewer;
    activating the display panel and turning-on at least one of the slit sets of the tracking panel according to the selected slit data bank; and
    turning-on parts of the light-emitting regions corresponding to the updated region during the frame period.

27. The display method of claim 26, wherein a method of establishing a plurality of slit data banks corresponding to a plurality of viewing angles of the stereoscopic display apparatus comprises:
    inputting relationship of a right-eye optical path and a left-eye optical path corresponding to different viewing angles of the stereoscopic display apparatus; and
    estimating positions that the light passing through the tracking panel along the right-eye optical path and the left-eye optical path so as to obtain each of the slit data banks.

28. The display method of claim 26, wherein a frame rate of the display panel is about or more than 120 Hz and the single-eye images are displayed by the display panel alternately.

29. The display method of claim 26, wherein more than one of the slit data banks are selected simultaneously and more than one of the slit sets are turned-on according to the selected slit data banks.

30. The display method of claim 26, further comprising:
selecting another one of the slit data banks according to a change of position of viewer; and
turning-on another one of the slit sets of the tracking panel according to the selected slit data bank.

31. A display method for the stereoscopic display apparatus of claim 14, the display method comprising:
establishing a plurality of slit data banks corresponding to a plurality of viewing angles of the stereoscopic display apparatus;
selecting at least one of the slit data banks according to position information of viewer;
activating the display panel and controlling at least one of the slit sets of the tracking panel according to the selected slit data bank; and
changing on/off state of the transmissive areas corresponding to the updated region in the selected slit set during the frame period.

32. The display method of claim 31, wherein changing on/off state of the transmissive areas corresponding to the updated region in the selected slit set comprises:
turning-on parts of the transmissive areas corresponding to the updated region in the selected slit set; and
turning-off parts of the transmissive areas corresponding to the non-updated region in the selected slit set.

33. The display method of claim 32, further comprising:
turning-off parts of the transmissive areas corresponding to the updated region in another selected slit set during the previous frame period; and
turning-on parts of the transmissive areas corresponding to the non-updated region in another selected slit set during a previous frame period.

34. The display method of claim 31, wherein a method of establishing a plurality of slit data banks corresponding to a plurality of viewing angles of the stereoscopic display apparatus comprises:
inputting relationship of a right-eye optical path and a left-eye optical path corresponding to different viewing angles of the stereoscopic display apparatus; and
estimating positions that the light passing through the tracking panel along the right-eye optical path and the left-eye optical path so as to obtain each of the slit data banks.

35. The display method of claim 31, wherein a frame rate of the display panel is about or more than 120 Hz and the single-eye images are displayed by the display panel alternately.

36. The display method of claim 31, wherein more than one of the slit data banks are selected simultaneously and more than one of the transmissive areas are turned-on according to the selected slit data banks.

37. The display method of claim 31, further comprising:
selecting another one of the slit data banks according to a change of position of viewer; and
turning-on parts of the transmissive areas in another one of the slit sets of the tracking panel according to the selected slit data bank.

* * * * *